United States Patent [19]

Lindner et al.

[11] Patent Number: 4,859,744

[45] Date of Patent: Aug. 22, 1989

[54] PROCESS FOR THE PRODUCTION OF GRAFT POLYMERS OF HIGH RUBBER CONTENT

[75] Inventors: Christian Lindner, Cologne; Karl-Heinz Ott, Leverkusen, both of Fed. Rep. of Germany

[73] Assignee: Bayer Aktiengesellschaft, Leverkusen, Fed. Rep. of Germany

[21] Appl. No.: 164,806

[22] Filed: Mar. 7, 1988

[30] Foreign Application Priority Data

Mar. 19, 1987 [DE] Fed. Rep. of Germany ....... 3708913

[51] Int. Cl.$^4$ .................. C08F 279/02; C08F 279/04; C08L 51/04
[52] U.S. Cl. ...................................... 525/256; 525/83; 525/84; 525/86; 525/71; 525/310; 525/313; 525/316
[58] Field of Search ...................... 525/256, 84, 86, 71

[56] References Cited

U.S. PATENT DOCUMENTS

| | | | |
|---|---|---|---|
| 3,118,854 | 1/1964 | Hess et al. | 525/86 |
| 3,288,887 | 11/1966 | Yoshino et al. | 525/256 |
| 3,651,177 | 3/1972 | Saito et al. | 525/902 |
| 3,657,391 | 4/1972 | Curfman | 525/84 |
| 3,670,052 | 6/1972 | Saito et al. | 525/84 |
| 3,775,514 | 11/1973 | Amagi et al. | 525/84 |
| 3,880,786 | 4/1975 | Feast et al. | 525/262 |
| 3,959,895 | 6/1976 | Lonning | 525/902 |
| 4,351,923 | 9/1982 | Tokas | 525/262 |

*Primary Examiner*—Carman J. Seccuro
*Attorney, Agent, or Firm*—Connolly and Hutz

[57] ABSTRACT

The invention relates to a process for the production of graft polymers of resin-forming monomers on a rubber in which a very high graft yield is obtained by the use of an initiator system of an organic hydroperoxie and ascorbic acid. The graft polymers obtained are suitable as thermoplastic molding compositions or as constituents thereof.

3 Claims, No Drawings

PROCESS FOR THE PRODUCTION OF GRAFT POLYMERS OF HIGH RUBBER CONTENT

This invention relates to a process for the production of graft polymers of resin-forming monomers on a rubber in which a very high graft yield is obtained through the use of an initiator system of an organic hydroperoxide and ascorbic acid. The graft polymers obtained are suitable as thermoplastic molding compositions or as constituents thereof.

Graft polymers of resin-forming monomers on rubber are known and have been successfully used for the production of moldings of synthetic materials. In the production of these graft polymers by radical polymerization, free polymers of the resin-forming monomers are formed as secondary products. The ratios are quantitatively described by the degree of grafting, i.e. by the ratio by weight of the graft-polymerized monomers to the (rubber) graft base. In graft polymers having rubber contents of 40% by weight, the maximum degree of grafting is thus 1.5, whereas in graft polymers having rubber contents of 90% by weight it is 0.1 where the resin-forming monomers are completely grafted onto the rubber. The degree of grafting depends upon the rubber content and, accordingly, is particularly suitable for the comparison of graft polymers having the same rubber content. In general, the degree of grafting is lower than the maximum possible degree of grafting, amounting for example to around 0.7 for rubber contents of 40% by weight and to around 0.05 for rubber contents of 90% by weight, i.e. only part of the resin formed during the graft polymerization is actually grafted onto the rubber. The graft yield, i.e. the ratio by weight of grafted monomer to total resin monomer (the value is multiplied by 100 and expressed in %) is more suitable for characterizing highly grafted rubbers (or for describing the extent of a graft polymerization).

In the event of complete grafting, the graft yield is 100%. Typical graft yields for graft polymers having rubber contents of 40 to 90% by weight are around 40 to 60%, high graft yields generally being obtained only with graft polymers of high rubber content (over 60%). However, there are many applications which require graft polymers characterized by as high a graft yield as possible (i.e. containing minimal quantities of free polymer of the resin-forming monomers), because the polymer which is not attached to the rubber influences the physical properties (particularly in mixtures with other components). Thus, in the presence of (or with reduced quantities of) the free polymers, the graft polymers lose their pure thermoplast character and become more like elastomers to the point where they have the appearance of thermoplastically processible rubbers.

It has now been found that graft polymers of resin-forming monomers on rubbers (also referred to hereinafter as resin/rubber graft polymers) characterized by a high graft yield can be produced (so that they surprisingly contain small amounts of free polymers) providing the graft polymerization is carried out in emulsion using an initiator system of an organic hydroperoxide and ascorbic acid.

Accordingly, the present invention relates to a process for the production of graft polymers of
(a) 40 to 90% by weight and more especially 50 to 80% by weight of an at least partly crosslinked particulate diene rubber having an average particle diameter of 0.1 to 0.6 μm and
(b) 60 to 10% by weight and more especially 50 to 20% by weight styrene, acrylonitrile, methyl methacrylate or mixtures thereof
by emulsion graft polymerization, characterized in that an initiator system of an organic hydroperoxide and ascorbic acid is used so that a graft yield of greater than 60% by weight, preferably greater than 70% by weight and more preferably greater than 80% by weight is obtained.

In one particularly preferred embodiment, the graft polymerization of the monomers (b) is carried out in aqueous emulsion in the presence of an emulsion of the rubber polymer (a) at temperatures of 40° to 70° C. and preferably at temperatures of 50° to 70° C. using an initiator system of an organic hydroperoxide (I) and ascorbic acid (II), 0.3 to 1.5 parts by weight (I) and 0.1 to 1 part by weight (II) being used per 100 parts by weight of graft monomers and the ratio by weight of (I) to (II) being 0.3 to 15, preferably 1 to 10 and more preferably 3 to 8.

The present invention also relates to the graft polymers thus obtained.

The present invention alo relates to thermoplastic molding compositions of at least one graft polymer according to the invention and at least one thermoplastic resin, for example a styrene-acrylonitrile copolymer, an α-methyl styrene-acrylonitrile copolymer, polyvinyl chloride (PVC) and ABS.

Graft polymers in the context of the invention are polymers obtained by polymerization of resin-forming monomers in the presence of a diene rubber, wherein the polyner of the resin-forming monomers is graft-polymerized to a very high extent.

Rubbers in the context of the invention are preferably diene rubbers, such as homopolymers of butadiene, isoprene, chloroprene, and copolymers of these monomers with up to 40% by weight of other monomers, such as acrylonitrile, styrene, alkyl acrylate, alkyl methacrylate and, optionally, relatively small quantities of polyfunctional vinyl monomers, such as divinylbenzene and diol bisacrylates.

The rubbers are at least partly crosslinked and have gel contents of 10 to 90% by weight and more especially 40 to 80% by weight and are particulate with average particle sizes (d50 values) of 0.1 to 0.6 μm and more especially 0.1 to 0.5 μm. Particulate rubbers such as these are known and are produced by emulsion polymerization, generally being present as lattices.

According to the invention, the graft polymers may be prepared in aqueous emulsion by polymerization of the monomers onto a rubber present in aqueous emulson. Surface-active auxiliaries, emulsifiers or dispersants and optionally additives are normally used to establish certain pH values and electrolyte contents during the graft polymerization. In some cases, the emulsion graft polymerization may even be carried out in the absence of an emulsifier, particularly when small quantities of monomer, based on the quantity of rubber, are used or when the quantities of emulsifier already present in the rubber emulsion (latex) itself are sufficient to guarantee the graft polymerization of the monomers in the emulsion state with adequate emulsion stability.

Particularly suitable emulsifiers are anionic emulsifiers, preferably alkali metal salts of fatty acids, resinic acids, disproportionated resinic acids, alkylsulfonic acids, arylsulfonic acids. Thev are generally used in quantities of up to 5% by weight and preferably in quantities of up to 2.5% by weight, based on the monomers to be polymerized.

Suitable hydroperoxides are, for example, cumene hydroperoxide, tert.-butyl-hydroperoxide, hydrogen peroxide, preferably cumene hydroperoxide and tert.-butyl hydroperoxide, i.e. hydroperoxides having high half-life values.

Thermoplastic resins in the context of the invention are, for example, styrene-acrylonitrile copolymers, α-methyl styrene-acrylonitrile copolymers, which may optionally also contain styrene in copolymerized form, polyvinyl chloride and acrylonitrile-styrene-butadiene polymers of the type known as ABS plastics.

The process according to the invention may be carried out, for example, as follows:

An aqueous emulsion of a partly crosslinked diene rubber is discontinuously or continuously grafted in aqueous emulsion. The graft monomers and, optionally, additional emulsifier and hydroperoxide and also ascorbic acid solutions are added to the rubber emulsion at polymerization temperatures of 40° to 70° C. and more especially at polymerization temperatures of 50° to 70° C. maintaining the quantitative ratios indicated above. In exceptional cases, catalytically small quantities of heavy metal cations, particularly Fe, may be added to the polymerization as a further component of the initiator system, particularly when diene rubber emulsions which themselves already contain relatively large quantities of complexing agents have to be used. The process according to the invention is normally carried out without addition of iron ions. This method is preferred and enables graft polymers substantially free from, i.e. low in, heavy metals to be obtained, which is a considerable advantage because traces of such metals are known to have an adverse affect upon the performance properties of rubbers. The process uses an aqueous solution of ascorbic acid and aqueous solutions of hydroperoxide. It is of advantage to introduce inadequately water-soluble hydroperoxides, such as cumene hydroperoxide, in the form of an aqueous emulsion into the polymerization system. In emulsions such as these, the emulsifier used is advantageously the same emulsifier as used for the graft polymerization.

The hydroperoxide and the ascorbic acid may be introduced continuously or in portions into the graft polymerization. In a preferred variant, some of the hydroperoxide is initially introduced into the reactors with the rubber to be grafted. The graft monomers and the remaining ascorbic acid, hydroperoxide and optionally emulsifier are separately introduced into the reaction as the polymerization of the graft monomers progresses.

The quantities of hydroperoxide and ascorbic acid are critical. Overdosing of hydroperoxide and/or ascorbic acid adversely affects the graft polymerization. The graft yield is reduced; the molecular weight of the grafted resin and of the free resin becomes lower. In addition, underdosing or overdosing of hydroperoxide and ascorbic acid can crucially affect monomer conversion and emulsion stability, so that the graft polymerization becomes technically impracticable. For best results of the process and to optimize the structure of the graft polymers and their physical properties, it is most advisable to operate at 40° to 70° C. and to apply the quantities of hydroperoxide and ascorbic acid indicated above in the graft polymerization process.

Where the graft polymerization is continued to monomer conversions of greater than 90% by weight and preferably greater than 98% by weight, storable graft polymer emulsions having polymer contents of 25 to 50% by weight are obtained. The graft polymer itself may readily be isolated from the emulsions by known coagulation techniques (for example using acids or salts). Where it is desired to combine the graft polymers with thermoplastic resins which are themselves present in emulsion, the graft polymer emulsions may be mixed and coagulated together with the resin emulsion.

The graft polymers according to the invention are distinguished by particular thermoplastic-elastic properties which are reflected, for example, in their stress-strain behavior and in their modulus. Accordingly, they may be used with advantage for applications requiring rubber-like behavior in combination with a certain rigidity, i.e. for the production of rubber articles which do not have to be vulcanized.

On the other hand, they represent valuable components for thermoplastic molding compositions, i.e. for the production of moldings of high notched impact strength showing unusual combinations of properties, for example thermal stability under load and notched impact strength or modulus behavior and notched impact strength. They are particularly suitable for blending with PVC. The resulting molding compositions may be extruded or injection molded, more especially to form tubes, sheets, large containers or deep-drawn films.

EXAMPLES (1) Polymers used
(1.1) Polyvinyl chloride (PVC), K-value 70
(1 2) AMS resin: copolymer of 69% by weight α-methyl styrene and 31% by weight acrylonitrile prepared by radical emulsion polymerization. The copolymer has a Staudinger Index $[\eta]$ of 0.6 dl/g, as measured in DMF at 23° C.
(1.3) Emulsion of a partly crosslinked, coarse-particle polybutadiene having an average particle diameter of 0.38 μm ($d_{50}$ value) and a gel content of 89% by weight. The emulsion contains 50% by weight polymer solids.

(2) Graft polymers
(2.1) Graft polymers for comparison (2.1.1) Graft polymer of 75% by weight diene rubber and 25% by weight SAN copolymer 4560 parts by weight of the emulsion (1.3) and 2250 parts by weight of water are initially introduced into a reactor. After heating to 65° C., an initiator solution of 5 parts by weight potassium peroxydisulfate in 150 parts by weight water is introduced. The following two solutions are then introduced into the reactor with stirring over a period of 4 hours at 65° C.:

| | |
|---|---|
| 1. styrene | 558 parts by weight |
| acrylonitrile | 217 parts by weight |
| 2. water | 1250 parts by weight |
| Na salt of disproportionated abietic acid | 25 parts by weight |
| 1N sodium hydroxide | 20 parts by weight |

Polymerization is then completed by stirring for 4 hours at 65° C. The monomer conversion is higher than 98% by weight. After stabilization with 1.2 parts by weight phenolic antioxidant per 100 parts by weight graft polymer, the graft polymer is isolated by coagulation with a mixture of acetic acid and Mg sulfate, washed and dried to form a powder.

(2.1.2) Graft polymer of 50% by weight diene rubber and 50% by weight SAN copolymer 1500 parts by weight of the emulsion (1.3) and 1030 parts by weight water are inititally introduced into a reactor. After heating to 65° C., an initiator solution of 3 parts by weight potassium peroxydisulfate in 50 parts by weight water is introduced. The following two solutions are then introduced into the reactor over a period of 6 hours at 65° C.:

| 1. styrene | 540 parts by weight |
|---|---|
| acrylonitrile | 210 parts by weight |
| 2. water | 1000 parts by weight |
| Na salt of disproportionated abietic acid | 13 parts by weight |
| 1N sodium hydroxide | 10 parts by weight |

Polymerization is then completed by stirring for 4 hours at 65° C. The monomer conversion is higher than 98% by weight. The graft polymer is stabilized and isolated in the same way as described in (2.1.1). The graft yield of the SAN graft process is 55% by weight.

(2.2) Graft polymer (according to the invention) of 50% by weight diene rubber and 50% by weight SAN copolymer A mixture of 200 parts by weight of the latex (1.3) and 149 parts by weight water are initially introduced into a reactor and heated to 60° to 62° C. The following two solutions or emulsions are then introduced into the reactor at that temperature in the following order:

(a) 1 0.0836 part by weight cumene hydroperoxide
6.9600 part by weight water
0.0600 part by weight Na salt of C14-C16 alkylsulfonic acids
(b)
0.0557 part by weight ascorbic acid
6.9600 parts by weight water The following solutions are then introduced into the reactor with stirring over a period of 4 hours at an internal temperature of 60° to 62° C.:
(S1) 39.05 parts by weight water
4.00 parts by weight Na salt dispropionated abietic acid
3.10 parts by weight 1N sodium hydroxide
0.62 part by weight cumene hydroperoxide
(S2)
72 parts by wight styrene
28 parts by weight acrylonitrile
(S3)
39.8 parts by weight water
0.105 part by weight ascorbic acid Polymerization is then completed over a period of 6 hours at 60° to 62 ° C. The monomer conversion is higher than 97% by weight. The graft polymer is stabilized and isolated in the same way as described above in (2.1.1). The graft yield of the SAN graft is 89% by weight.

(3) Properties of the molding compositions

To produce molding compositions, the components shown in Table 1 below are mixed in the quantities indicated; 2% by weight Ba/Cd laurate (solid), 0.3% by weight sterically hindered phenolic antioxidant (solid) and 0.2% by weight ester wax are added as stabilizer and lubricant, respectively. The molding compositions are homogenized on mixing rolls (at 180 ° C.) and processed to test specimens at 190 ° C.

TABLE 1

Composition of the molding compositions

| Molding composition | Composition (in parts by weight) | | | | |
|---|---|---|---|---|---|
| | 1.1 | 1.2 | 2.1.1 | 2.1.2 | 2.2 |
| 3.1 | 55 | 34.65 | | | 10.35 |
| 3.2 | 55 | 34.65 | | 10.35 | |
| 3.3* | | 71 | | 29 | |
| 3.4* | | 71 | | | 29 |
| 3.5 | 93 | | 7 | | |
| 3.6 | 93 | | | 7 | |
| 3.7 | 93 | | | | 7 |
| 3.8 | 85 | | 15 | | |
| 3.9 | 85 | | | 15 | |
| 3.10 | 85 | | | | 15 |

*Molding compositions 3.3 and 3.4 contain only 2% by weight ester wax as additive

TABLE 2

Properties of the molding compositions

| Molding composition | Notched impact strength (kJ/m²) | | Deflection temperature under load, Vicat B (°C.) | E-Modulus (in flexure) (MPa) | |
|---|---|---|---|---|---|
| | 20° C. | 0° C. | | | |
| 3.1 | 24.4 | 11.3 | 95 | | |
| 3.2 | 10.0 | 8.0 | 94 | | |
| 3.3 | 8.5 | | 113 | 2450 | comparison test |
| 3.4 | 14 | | 113 | 2020 | |
| 3.5 | 9.2 | 7.5 | | | comparison test |
| 3.6 | 6.7 | 5.4 | | | comparison test |
| 3.7 | 11.8 | 8.0 | | | |
| 3.8 | 40.5 | 50 | | | comparison test |
| 3.9 | 25.0 | 12.6 | | | |
| 3.10 | 55.4 | 39 | | | |

A comparison of molding compositions 3.1 and 3.2 shows the advantageous notched impact strengths obtained where the graft polymers according to the invention are used; this is surprising because the deflection temperature under load is unaffected.

Comparison of molding compositions 3.3 and 3.4 shows that molding composition 3.4 shows particularly favorable flexibility for a constant deflection temperature under load and increased notched impact strength, so that molding compositions of this type are particularly suitable for the production of thermoplastic moldings of relatively high flexibility and softness.

Comparison of molding compositions 3.5 to 3.10 shows that the graft polymers according to the invention have superior toughness which is not matched even by known graft polymers of particularly high rubber content (75% by weight).

The notched impact strength was determined in accordance with DIN 53 453, the E-modulus in accordance with DIN 53 457 and the deflection temperature under load in accordance with DIN 53 460.

The graft yield was determined by fractional separation using the separating liquids dimethylformamide/methylcyclohexane in an ultracentrifuge and by determining the quantities and chemical composition of the fractions thus obtained (see R. Kuhn, Makromol-Chemie 177, 1525 (1976).

We claim:

1. A process for the production of a graft polymer which comprises the emulsion graft polymerization of:
    (a) from 40 to 90%, by weight, of an at least partly cross.linked diene rubber having an average particle diameter of from 0.1 to 0.6 μm; and
    (b) from 60 to 10%, by weight, of one or more of styrene, acrylonitrile and methyl methacrylate; an initiator system comprising an organic hydroperoxide and ascorbic acid being used and a graft yield of greater than 60%, by weight, being obtained.

2. A process as claimed in claim 1 wherein from 50 to 80%, by weight, of (a) and from 50 to 20%, by weight, of (b) are emulsion graft polymerized.

3. A process as claimed in claim 1 wherein the graft polymerization of (b) is carried out in aqueous emulsion in the presence of an emulsion of (a) at a temperature of from 40° to 70° C. using an initiator system of from 0.3 to 1.5 parts, by weight, of organic hydroperoxide and from 0.1 to 1 part, by weight, of ascorbic acid per 100 parts, by weight, (b) in a weight ratio of from 0.3:1 to 15:1.

* * * * *